United States Patent [19]
Wild

[11] 3,872,502
[45] Mar. 18, 1975

[54] SIMULTANEOUS CARD AND CASSETTE RECORDER SYSTEM

[75] Inventor: Albert F. Wild, Rochester, N.Y.

[73] Assignee: Tapecon, Inc., Rochester, N.Y.

[22] Filed: May 24, 1973

[21] Appl. No.: 363,321

[52] U.S. Cl. .............................. 360/2, 235/61.11 D
[51] Int. Cl. ......................... G11b 5/00, G11b 25/04
[58] Field of Search ............................ 360/2, 15, 94; 235/61.11 D; 274/4 J, 4 H

[56] References Cited

UNITED STATES PATENTS

| | | | |
|---|---|---|---|
| 3,519,762 | 7/1970 | Morris | 360/15 |
| 3,584,882 | 6/1971 | Krtous | 360/2 |
| 3,610,635 | 10/1971 | Schiff | 274/4 J |
| 3,800,315 | 3/1974 | Budrose | 360/2 |
| 3,800,321 | 3/1974 | Bolick | 360/94 |

*Primary Examiner*—Terrell W. Fears
*Assistant Examiner*—Jay P. Lucas
*Attorney, Agent, or Firm*—Cumpston, Shaw & Stephens

[57] ABSTRACT

A cassette tape recorder has a card adapter superposed over the cassette, and the recorder capstan extends through the cassette and into the adapter for powering a drive that moves the card through the adapter. A magnetic head in the adapter tracks a path on the card and is connected to the recorder circuitry for simultaneous operation of the cassette and the card.

5 Claims, 4 Drawing Figures

SIMULTANEOUS CARD AND CASSETTE RECORDER SYSTEM

THE INVENTIVE IMPROVEMENT

An earlier U.S. patent application Ser. No. 30,653 filed Apr. 22, 1970 and entitled, PLANAR DRIVE ADAPTER FOR CASSETTE TAPE RECORDER suggested a card-playing adapter that could be snap-fit into the cassette slot of a tape recorder. The adapter used many of the components of the host recorder, but played planar cards rather than cassette tapes.

This invention involves realization of the possibility of combining such an adapter with a cassette for simultaneous operation of both a card player and a cassette player. The invention suggests a simple construction making such simultaneous operation possible and includes switching arrangements providing for every possible mode of independent and simultaneous operation. The invention aims at simplicity, economy, versatility, and reliability in a cassette and card adapter combination.

SUMMARY OF THE INVENTION

The inventive system uses a cassette tape recorder having switches and amplifier circuitry and a card adapter superposed over the cassette in the recorder. A capstan in the recorder extends through the cassette and into the adapter for powering a drive that moves the cards through the adapter. A magnetic head in the adapter tracks a path on the card and is connected to the amplifier circuitry of the recorder for simultaneous operation of the cassette and the card.

DRAWINGS

DETAILED DESCRIPTION

Figure 1:
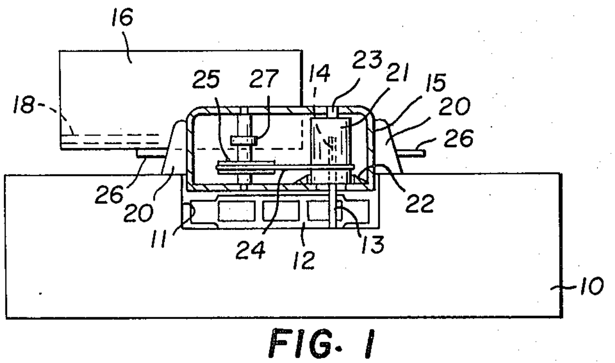
FIG. 1 is a partially schematic, partially cut-away, elevational view of a preferred embodiment of the inventive system.
Figure 2:
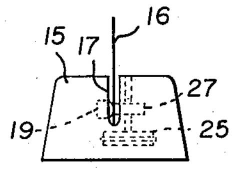
FIG. 2 is a partially schematic, side elevational view of the adapter of FIG. 1.

The system illustrated schematically in FIG. 1 includes a cassette tape recorder 10 having a cassette slot 11 containing a cassette 12 with a card adapter 15 superposed over cassette 12. Card adapter 15 moves a planar card 16 through a slot 17 so that a magnetic strip 18 on card 16 is tracked by a magnetic head 19.

Cassette 12 can operate at the same time that card adapter 15 operates for simultaneous playing or recording on card 16 or on the tape in cassette 12. This allows many operational possibilities not previously obtainable and yet uses a fairly simple and economical structure. For example, several cards 16 can be recorded while the same recordings are made on the tape in cassette 12 to make a master record of the individual messages put on cards 16. Messages can be transferred from card to cassette, or cassette to card, and either cassette or card can be used independently of the other. This greatly expands the operational capacity of a card adapter and a cassette recorder without significantly increasing the expense.

Tape recorder 10 has a capstan 13 that extends through cassette 12 and into the bottom of card adapter 15 superposed over cassette 12. Adapter 15 is supported over cassette 12 by lugs 20 engaging the top of recorder 10, and adapter 15 is shaped to fit accurately over cassette slot 11 and to operate with or without a cassette 12 in place. The upper end 14 of capstan 13 is splined to fit into a pulley 21 carried in adapter 15. Pulley 21 is freely rotatable and restrained from lateral motion by a retainer ring 22 at the bottom and a bearing 23 at the top.

Pulley 21 drives an O-ring belt 24 that turns a pulley wheel 25 supported in adapter 15. A support track 26 is spaced just above pulley 25 for supporting the lower edge of card 16 in its travel through adapter 15, and a drive wheel 27 turns with pulley 25 above support track 26 for engaging card 16 to move it along in slot 17. Drive wheel 27 is preferably opposite magnetic head 19 which tracks magnetic strip 18 on card 16.

Cassette 12 is operated from capstan 13 in the usual way, and through pulleys 21 and 25, and drive wheel 27, capstan 13 also drives card 16 through slot 17. The drive of card 16 is preferably at a relatively slow speed compared to the speed of a tape in cassette 12. With proper switching of electronic components, record and play operations for card 16 and cassette 12 can be independent or simultaneous in a variety of modes. These are best explained relative to the diagram of FIG. 3.

Recorder 10 includes a microphone 28, an amplifier 29, a speaker 30, a magnetic head 40 and several switches 31–36 for operation in different modes. With switches 31 – 36 set in the illustrated positions, recorder 10 is set to play a cassette.

Card adapter 15 has its magnetic head 19 connected to the circuitry of recorder 10 by any convenient means such as a plugin receptacle, spring contacts, or other means for various modes of independent and simultaneous operation with recorder 10. The various functional possibilities with the arrangement of FIG. 3 are set out in the following table which uses the symbol S to indicate a switch in the position shown, and a symbol O to indicate a switch in the position opposite to that shown.

| Function | 31 | 32 | 33 | 34 | 35 | 36 |
|---|---|---|---|---|---|---|
| 1. Record Card | O | S | O | O | S | S |
| 2. Play Card | S | O | S | S | S | O |
| 3. Record Cassette | O | S | O | O | O | O |
| 4. Play Cassette | S | S | S | S | S | S |
| 5. Record Card and Cassette | O | S | O | O | O | S |
| 6. Play Card and Record Cassette | O | O | S | O | O | O |
| 7. Play Cassette and Record Card | S | S | S | O | S | S |
| 8. Silently play Card and Record its previously-recorded message on Cassette | S | O | O | O | S | O |
| 9. Silently play Cassette and record its previously recorded message on card | S | S | O | O | S | S |

Figures 3, 4:
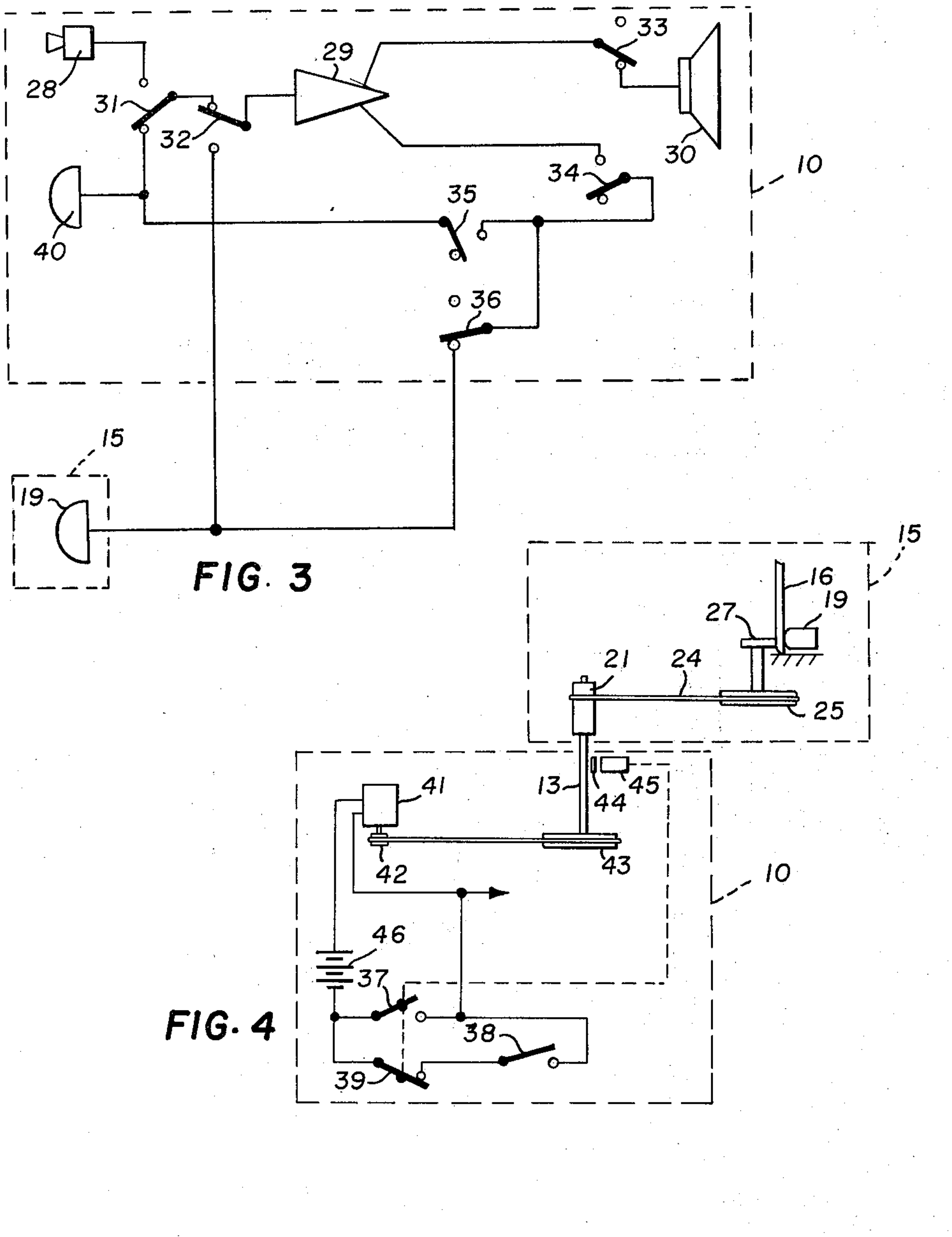
FIG. 3 is a schematic circuit diagram for the system of FIG. 1.
FIG. 4 is a schematic circuitry and mechanical operation diagram for the system of FIG. 1.

FIG. 4 schematically shows a preferred arrangement for powering recorder 10 and card adapter 15. Motor 41 supplies driving power to capstan 13 through pulleys 42 and 43, and capstan 13 drives the tape 44 in cassette 12 when pinch roller 45 presses tape 44 against capstan 13. Pinch roller 45 is movable relative to cassette 12 as is generally known. Battery 46 powers motor 41, and switch 37 is the main, on/off switch for recorder 10. When switch 37 is open as illustrated, a mechanical connection with pinch roller 45 holds pinch roller 45 away from tape 44, and simultaneously applies brakes (not shown) to the tape reels (not shown) in cassette 12 and when switch 37 is closed, pinch roller 45 is moved to press tape 44 against capstan 13 and brakes (not shown)) are released.

If cassette 12 is to be operated without card 16, the drive powering roller 27 preferably operates in the usual way. There is no disadvantage in letting the drive train for card adapter 15 operate idly, since any card in adapter 15 will be quickly moved clear of head 19. However, when card operation is desired without cassette operation, pinch roller 45 must be moved away from capstan 13 and brakes (not shown) applied to reels (not shown) in cassette 12 so that tape 44 can stand still while card 16 moves. Opening switch 37 accomplishes this, but also shuts off the power to motor 41. Hence, switches 38 and 39 are preferably added to recorder 10 so that motor 41 can be operated with switch 37 open. Switch 39 is coupled to on/off switch 37 to assume the opposite state of switch 37, and switch 38 is a manually operable switch that can be closed to operate card adapter 15 while the cassette drive is inoperative.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the different constructions, drives, and operating variations possible with the inventive combination of a card adapter and cassette tape recorder.

I claim:

1. A simultaneous card and cassette recorder system comprising:

a. a tape recorder for said cassette, said recorder having a capstan for a tape drive for said cassette, a magnetic head for tracking said tape in said cassette, switches and amplifier circuitry;

b. an adapter for said card, said adapter being configured to be superposed over the region normally occupied by said cassette in said recorder so that said cassette and said adapter can both be operably placed on said recorder simultaneously;

c. said capstan extending through said cassette region and into the region of said adapter superposed over said cassette region;

d. means driven by said capstan in said adapter for moving said card through said adapter;

e. a magnetic head in said adapter for tracking a path on said card; and f. said switches being arranged for connecting said magnetic head of said recorder and said magnetic head of said adapter selectively with said amplifier circuitry for recording or playing said card or said cassette, or simultaneously recording or playing both said card and said cassette.

2. The system of claim 1 wherein said means for moving said card includes a pulley, means for connecting said pulley to said capstan, and a wheel driven by said pulley and engaging said card for moving said card through said recorder.

3. The system of claim 1 wherein said switches are arranged for connecting said magnetic head of said recorder and said magnetic head of said adapter selectively with said amplifier circuitry for playing said card or said cassette while simultaneously and respectively recording on said cassette or said card.

4. The system of claim 3 wherein said switches are arranged for connecting said magnetic head of said recorder with said magnetic head of said adapter selectively with said amplifier circuitry for playing said card or said cassette silently while simultaneously and respectively recording on said cassette or said card.

5. The system of claim 1 wherein said recorder has a pinch roll for said tape in said cassette, and including means for holding said pinch roll away from said cassette tape and means for operating said capstan while said pinch roll is held away from said cassette tape.

* * * * *